(12) United States Patent
Pin et al.

(10) Patent No.: US 11,505,508 B2
(45) Date of Patent: Nov. 22, 2022

(54) PART COMPRISING A SUBSTRATE AND AN ENVIRONMENTAL BARRIER

(71) Applicants: SAFRAN CERAMICS, Le Haillan (FR); CENTRE NATIONAL DE LA RECHERCHE SCIENTIFIQUE (CNRS), Paris (FR); UNIVERSITE DE BORDEAUX, Bordeaux (FR)

(72) Inventors: Lisa Pin, Moissy-Cramayel (FR); Simon Arnal, Bordeaux (FR); Francis Rebillat, Pessac (FR); Fabrice Mauvy, Canejan (FR)

(73) Assignees: SAFRAN CERAMICS, Le Haillan (FR); CENTRE NATIONAL DE LA RECHERCHE SCIENTIFIQUE (CNRS), Paris (FR); UNIVERSITE DE BORDEAUX, Bordeaux (FR)

( * ) Notice: Subject to any disclaimer, the term of this patent is extended or adjusted under 35 U.S.C. 154(b) by 653 days.

(21) Appl. No.: 16/475,551

(22) PCT Filed: Dec. 29, 2017

(86) PCT No.: PCT/FR2017/053872
§ 371 (c)(1),
(2) Date: Jul. 2, 2019

(87) PCT Pub. No.: WO2018/127652
PCT Pub. Date: Jul. 12, 2018

(65) Prior Publication Data
US 2019/0345074 A1    Nov. 14, 2019

(30) Foreign Application Priority Data
Jan. 6, 2017    (FR) ...................................... 1750127

(51) Int. Cl.
*C04B 41/00*    (2006.01)
*C04B 41/50*    (2006.01)
(Continued)

(52) U.S. Cl.
CPC ............ *C04B 41/89* (2013.01); *C04B 41/009* (2013.01); *C04B 41/4527* (2013.01);
(Continued)

(58) Field of Classification Search
None
See application file for complete search history.

(56) References Cited

U.S. PATENT DOCUMENTS

2002/0098391 A1\* 7/2002 Tanaka ................ C04B 41/5024
428/697
2004/0175597 A1    9/2004 Litton et al.
(Continued)

FOREIGN PATENT DOCUMENTS

CN    1670337 A    9/2005
CN    1769043 A    5/2006
(Continued)

OTHER PUBLICATIONS

Nasiri, Thermal Properties of Rare-Earth Monosilicates for EBC on Si-Based Ceramic Composites, Journal of the American Ceramic Society, 99[2], 2016, p. 589-596 (Year: 2016).*
(Continued)

*Primary Examiner* — David Sample
(74) *Attorney, Agent, or Firm* — Pillsbury Winthrop Shaw Pittman LLP

(57) ABSTRACT

A part includes a substrate having, adjacent to a surface of the substrate, at least a portion that is made of a material that contains silicon, and an environmental barrier formed on the surface of the substrate, the environmental barrier including a first layer including at least one first rare earth silicate and
(Continued)

presenting grains with a mean size less than or equal to 1 µm; and a second layer covering the first layer, the second layer including at least one rare earth silicate and presenting grains with a mean size greater than 1 µm.

11 Claims, 3 Drawing Sheets

(51) Int. Cl.
    *C04B 41/89*      (2006.01)
    *C04B 41/52*      (2006.01)
    *C04B 41/45*      (2006.01)
    *F01D 5/28*      (2006.01)

(52) U.S. Cl.
    CPC ...... *C04B 41/4547* (2013.01); *C04B 41/5024* (2013.01); *C04B 41/52* (2013.01); *F01D 5/284* (2013.01); *F01D 5/288* (2013.01); *F05D 2300/15* (2013.01)

(56) References Cited

U.S. PATENT DOCUMENTS

| | | | |
|---|---|---|---|
| 2006/0014029 A1 | 1/2006 | Saak et al. | |
| 2011/0203281 A1* | 8/2011 | Sarrafi-Nour | C23C 28/00 60/722 |
| 2011/0256411 A1 | 10/2011 | Courcot et al. | |
| 2014/0072805 A1 | 3/2014 | Andreani et al. | |
| 2015/0079371 A1* | 3/2015 | Nakada | C04B 35/58085 428/448 |
| 2016/0108510 A1* | 4/2016 | Kirby | C04B 41/009 501/133 |
| 2016/0281513 A1 | 9/2016 | Kirby | |

FOREIGN PATENT DOCUMENTS

| | | | |
|---|---|---|---|
| CN | 106342075 B | 4/2012 | |
| CN | 104193409 A | 12/2014 | |
| CN | 106007809 A | 10/2016 | |
| EP | 2 918 570 A2 | 9/2015 | |
| RU | 2519250 C2 | 6/2014 | |
| RU | 2579054 C2 | 3/2016 | |
| RU | 2579592 C1 | 4/2016 | |
| WO | WO 2014/150380 A1 | 9/2014 | |
| WO | WO-2014150380 A1 * | 9/2014 | ............ F01D 5/284 |

OTHER PUBLICATIONS

International Search Report as issued in International Patent Application No. PCT/FR2017/053872, dated Mar. 29, 2018.

* cited by examiner

PART COMPRISING A SUBSTRATE AND AN ENVIRONMENTAL BARRIER

CROSS-REFERENCE TO RELATED APPLICATIONS

This application is the U.S. National Stage of PCT/FR2017/053872, filed Dec. 29, 2017, which in turn claims priority to French patent application number 1750127 filed Jan. 6, 2017. The content of these applications are incorporated herein by reference in their entireties.

BACKGROUND OF THE INVENTION

The invention relates to protecting a substrate in which at least a portion adjacent to a surface of the substrate is made of a material containing silicon, and while the substrate is in use at high temperature in an oxidizing medium, by forming an environmental barrier on the surface of the substrate.

A particular field of application is that of protecting parts made of ceramic matrix composite (CMC) material that form hot parts in gas turbines, such as combustion chamber walls, or turbine rings, turbine nozzles, or turbine blades or vanes, for aeroengines or for industrial turbines.

For such gas turbines, the need to improve efficiency and reduce polluting emissions leads to envisaging the use of ever higher temperatures in the combustion chambers.

Proposals have therefore been made to replace metal materials by CMC materials, in particular for the walls of combustion chambers or for turbine rings. Specifically, CMC materials are known to possess both good mechanical properties enabling them to be used for structural elements, and also the ability to retain those properties at high temperatures. CMC materials comprise fiber reinforcement made of refractory fibers, typically carbon fibers or ceramic fibers, which reinforcement is densified by a ceramic matrix, e.g. made of SiC.

In the operating conditions of aviation turbines, i.e. at high temperature in an atmosphere that is oxidizing and wet, CMC materials are sensitive to a phenomenon of corrosion. The corrosion of the CMC is the result of SiC oxidizing to silica, which, in the presence of water vapor, evaporates in the form of silicon hydroxide $Si(OH)_4$. The corrosion phenomena lead to the CMC recession, thereby affecting its lifetime. In order to limit such degradation in operation, proposals have been made to form environmental barrier coatings on the surfaces of CMC materials. Such coatings may comprise a bonding layer of silicon together with a rare earth silicate layer positioned on the bonding layer. The bonding layer serves firstly to improve the adhesion of the rare earth silicate layer, and secondly to form a protective layer of silica of low permeability to oxygen that contributes to protecting the CMC against oxidation. The rare earth silicate layer serves to limit the diffusion of water vapor to the silica layer that is formed by oxidizing silicon, and consequently to limit recession thereof. Nevertheless, the rare earth silicate layer can itself be sensitive to the phenomenon of recession and can evaporate in operation, thereby negatively affecting the lifetime of the coated substrate. It would therefore be desirable to improve the resistance to recession and the barrier effect against oxidizing species in environmental barrier coatings.

There thus exists a need to have novel environmental barriers that impart an improved lifetime to the underlying material in operation.

OBJECT AND SUMMARY OF THE INVENTION

To this end, in a first aspect, the invention provides a part comprising a substrate having, adjacent to a surface of the substrate, at least a portion that is made of a material that contains silicon, and an environmental barrier formed on the surface of the substrate, the environmental barrier comprising:
a first layer comprising at least one first rare earth silicate and presenting grains with a mean size less than or equal to 1 micrometer ($\mu m$); and
a second layer covering the first layer, the second layer comprising at least one second rare earth silicate and presenting grains with a mean size greater than 1 $\mu m$.

Unless specified to the contrary, the term "mean size" is used to mean the dimension given by the half-population statistical grain size distribution, known as D50. Unless specified to the contrary, the size of a grain is the largest dimension of that grain.

Mean grain size may be determined by analyzing images obtained by scanning electron microscopy (SEM).

The fact that the first layer presents a mean grain size that is less than or equal to 1 $\mu m$ makes it possible advantageously to improve the barrier effect of the environmental barrier against the diffusion of oxidizing species. Specifically, the sub-micron microstructure of the first layer presents a high density of grain boundaries that constitute barriers to the diffusion of oxidizing species. Furthermore, the fact of the second layer presents a mean grain size greater than 1 $\mu m$ gives the environmental barrier better resistance to recession. Specifically, boundaries between grains constitute preferred locations for evaporation and the second layer, so presenting grains of relatively large size and thus with a limited density of grain boundaries, serves to present increased resistance against this phenomenon.

The invention thus provides an environmental barrier that confers the underlying substrate with a lifetime that is improved at high temperature in an environment that is oxidizing and wet.

In an embodiment, the second layer presents grains of a mean size greater than or equal to 3 $\mu m$.

Advantageously, such a characteristic serves, still further, to improve the resistance to recession presented by the second layer as a result of its low density of grain boundaries.

In an embodiment, the second layer presents grains of a mean size greater than or equal to 5 $\mu m$.

Advantageously, such a characteristic serves, still further, to improve the resistance to recession presented by the second layer as a result of its low density of grain boundaries.

In an embodiment, the second layer presents grains of mean size greater than or equal to 10 $\mu m$.

Advantageously, such a characteristic serves, still further, to improve the resistance to recession presented by the second layer as a result of its low density of grain boundaries.

In an embodiment, the second layer is present in contact with the first layer.

In an embodiment, the second rare earth silicate is a rare earth monosilicate.

Using a rare earth monosilicate in the second layer serves advantageously, still further, to improve the resistance to recession of the environmental barrier, insofar as rare earth monosilicates are less sensitive to this phenomenon than are rare earth disilicates.

In an embodiment, the first rare earth silicate is a rare earth disilicate and the second rare earth silicate is a rare earth monosilicate.

In an embodiment, the first rare earth silicate and the second rare earth silicate are selected, independently of each other, from: an ytterbium silicate and an yttrium silicate.

In an embodiment, the first rare earth silicate is yttrium disilicate and the second rare earth silicate is ytterbium monosilicate.

In an embodiment, the environmental barrier further comprises an adhesion layer comprising silicon present between the first layer and the surface of the substrate.

The present invention also provides a method of fabricating a part as described above, the method comprising at least a first step of forming the first layer on the surface of the substrate, and a second step, performed after the first step, during which the second layer is formed on the first layer.

Before the first step, the method may also include a step of forming the adhesion layer on the surface of the substrate.

The present invention also provides a method of using a part as described above, the method comprising at least a step of using said part at a temperature higher than or equal to 800° C. in a medium that is oxidizing and wet.

BRIEF DESCRIPTION OF THE DRAWINGS

Other characteristics and advantages of the invention appear from the following description given by way of non-limiting example and with reference to the accompanying drawings, in which.

DETAILED DESCRIPTION OF EMBODIMENTS

In the following detailed description, an environmental barrier is to formed on a substrate made of CMC material containing silicon. Nevertheless, the invention is applicable to substrates of monolithic refractory material containing silicon, and more generally to substrates in which at least a portion adjacent to an outside surface of the substrate is made of a refractory material (composite or monolithic) that contains silicon. Thus, the invention seeks in particular to protect refractory materials constituted by monolithic ceramic, e.g. made of silicon carbide (SiC) or of silicon nitride ($Si_3N_4$), and more particularly it seeks to protect refractory materials such as ceramic matrix composite (CMC) composite materials containing silicon, e.g. CMC materials having a matrix made at least in part out of SiC.

Figure 1:
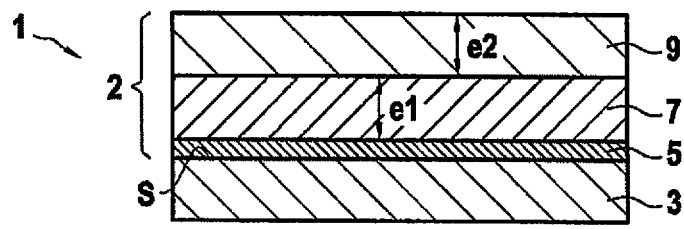
FIG. 1 is a diagram showing a part in a first embodiment of the invention.

FIG. 1 shows a part 1 made on a substrate 3 provided with an environmental barrier 2, in a first embodiment of the invention. The surface S of the substrate 3 is made of a refractory material containing silicon.

The substrate 3 made of CMC material containing silicon comprises fiber reinforcement, which may be made of carbon (C) fibers or of ceramic fibers, e.g. of SiC fibers or of fibers that are made essentially out of SiC, including Si—C—O or Si—C—O—N fibers, i.e. fibers also containing oxygen and possibly nitrogen. Such fibers are produced by the supplier Nippon Carbon under the reference "Nicalon" or "Hi-Nicalon" or "Hi-Nicalon Type-S", or by the supplier Ube Industries under the reference "Tyranno-ZMI". The ceramic fibers may be coated in a thin interphase layer made out of pyrolytic carbon (PyC), out of boron nitride (BN), or out of boron-doped carbon (BC), having 5 at % to 20 at % of B, the balance being C).

The fiber reinforcement is densified by a matrix that is formed, throughout the reinforcement or at least in an outer phase thereof, by a material containing silicon, such as a compound of silicon, e.g. SiC or a ternary Si—B—C system. The term "outer" phase of a matrix is used to mean a matrix phase that is formed last, being furthest away from the reinforcing fibers. Thus, the matrix may be made up of a plurality of phases of different kinds, and may for example comprise:

a mixed C—SiC matrix (with SiC being on the outside); or a sequenced matrix having alternating phases of SiC and matrix phases of lower stiffness, e.g. made out of pyrolytic carbon (PyC), out of boron nitride (BN), or out of boron-doped carbon (BC), with a terminal matrix phase made out of SiC; or a self-healing matrix with matrix phases made out of boron carbide ($B_4C$) or out of a ternary S—B—C system, possibly including free carbon ($B_4C$+C, Si—B—C+C), and with a terminal phase made out of Si—B—C or out of SiC.

In known manner, the matrix may be formed at least in part by chemical vapor infiltration (CVI). In a variant, the matrix may be formed at least in part using a liquid technique (impregnation with a matrix-precursor resin and transformation by cross-linking and pyrolysis, which process may be repeated), or by infiltrating molten silicon (known as "melt-infiltration"). With melt-infiltration, a powder is introduced into the fiber reinforcement that might possibly already be partially densified, which powder may be a carbon powder and optionally a ceramic powder, and a metal composition based on silicon in the molten state is then infiltrated so as to form a matrix of the SiC—Si type.

The environmental barrier 2 is formed on the entire outside surface S of the substrate 3 or on only a portion of that surface S, e.g. when only a portion of the surface S needs to be protected. In the example shown in FIG. 1, the environmental barrier 2 comprises a first layer 7 and a second layer 9, the second layer 9 being present on the first layer 7. The first layer 7 comprises at least a first rare earth silicate and presents a mean grain size that is less than or equal to 1 μm. As mentioned above, the particular microstructure of the first layer 7 gives it reduced ion conductivity, thereby making it more difficult for oxidizing and corrosive reactive species to diffuse therethrough. The second layer 9 comprises at least one second rare earth silicate and presents a mean grain size greater than 1 μm. As mentioned above, the microstructure of the second layer serves advantageously to improve the ability of the environmental barrier to withstand recession.

In this example, the second layer 9 is in contact in the first layer 7, however it would not go beyond the ambit of the invention for an intermediate layer to be present between the first and second layers. In the example shown in FIG. 1, the second layer 9 covers the first layer 7 entirely.

In the example of FIG. 1, the environmental barrier also presents an adhesion layer 5 present between the substrate 3 and the first layer 7. In the example shown, the adhesion layer 5 is present in contact with the surface S of the substrate 3. In this example, the first layer 7 is in contact with the adhesion layer 5.

The first layer 7 may have a single first rare earth silicate. In a variant, the first layer 7 may comprise a plurality of distinct first rare earth silicates. In particular, under such circumstances, the first layer 7 may be in the form of a solid solution and, by way of example, it may comprise ytterbium disilicate and yttrium disilicate.

Said at least one first rare earth silicate may be present in the first layer 7 at a molar content greater than or equal to 50%, or even 80%. In an embodiment, the first layer 7 may be constituted by said at least one first rare earth silicate. In a variant, the first layer 7 may comprise, in addition to the first rare earth silicate, one or more additional compounds, such as alumina.

In similar manner, the second layer 9 may comprise a single second rare earth silicate. In a variant, the second layer 9 comprises a plurality of distinct second rare earth silicates. In particular, under such circumstances, the second layer 9 may be in the form of a solid solution and, by way of example, it may comprise ytterbium disilicate and yttrium disilicate.

Said at least one second rare earth silicate may be present in the second layer 9 at a molar content greater than or equal to 50%, or even 80%. In an embodiment, the second layer 9 may be constituted by said at least one second rare earth silicate. In a variant, and as for the first layer 7, the second layer 9 may comprise, in addition to the second rare earth silicate, one or more additional compounds, such as alumina.

Each second rare earth silicate may optionally present the same chemical composition as the first rare earth silicate(s).

By way of example, the thickness $e_1$ of the first layer 7 may lie in the range 50 µm to 1.5 millimeters (mm). By way of example, the thickness $e_2$ of the second layer 9 may lie in the range 50 µm to 1.5 mm.

The thickness $e_2$ of the second layer 9 may be less than the thickness $e_1$ of the first layer 7. Under such circumstances, the second rare earth silicate may in particular be a rare earth monosilicate and the first rare earth silicate may be a rare earth disilicate. In this example, compatibility between the first layer and the second layer in terms of coefficient of thermal expansion is improved even more, given that rare earth monosilicates have a coefficient of thermal expansion that is greater than that of rare earth disilicates.

The adhesion layer 5 comprises silicon, and by way of example, it may be made out of silicon or out of mullite ($3Al_2O_3.2SiO_2$). In known manner, the adhesion layer 5 may form a protective layer that serves in operation to passivate silica (known as a "thermally grown oxide").

Figure 2:
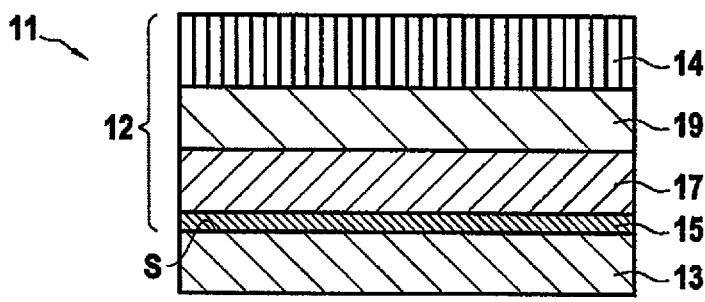
FIG. 2 is a diagram showing a part in a second embodiment of the invention.

With reference to FIG. 2, there is shown a part 11 in a second embodiment of the invention. In this example, the part 11 may comprise a substrate 13 having present on its surface S an environmental barrier 12. The substrate 13 may present the same characteristics as the substrate 3 described above. The environmental barrier 12 comprises an adhesion layer 15 that may present the same characteristics as the adhesion layer 5 described above, a first layer 17 present on the adhesion layer 15, which first layer may present the same characteristics as the first layer 7 as described above, and a second layer 19 present on the first layer 17, which second layer may present the same characteristics as the second layer 9 as described above.

In the example of FIG. 2, the environmental barrier 12 further comprises a top layer 14 present on the second layer 19. In the example shown, this top layer 14 is a thermal barrier ceramic layer presenting a structure that is porous. The top layer 14 may be made of rare earth silicate. In a variant, a top layer may be formed that is constituted by an abradable coating, e.g. when the CMC parts form turbine rings. The top layer could also constitute a protective coating against calcium-magnesium-alumino-silicates (CMASes). Depositing the top layer 14 serves to provide the environmental barrier with additional functions. In a variant, it is possible to have a part without the top layer 14 and in which the first or second layer presents, in addition to a thermal barrier function, protection against CMASes, or constitutes an abradable coating.

Figure 3:
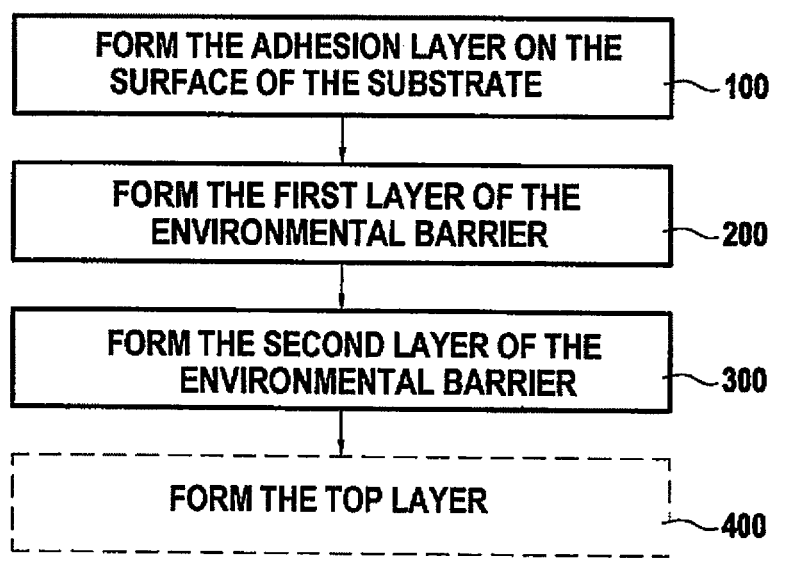
FIG. 3 is a flow chart showing a succession of steps that can be performed in order to fabricate a part of the invention.

FIG. 3 shows an example sequence of steps that can be performed in order to make a part of the invention.

Initially, the adhesion layer may be formed, in conventional manner, on the substrate by thermal spraying using a powder or a mixture of powders having the desired composition (step 100).

The first layer may be formed on the substrate by high velocity oxygen fuel (HVOF) spraying of an agglomerated-sintered powder of the first rare earth silicate having grains with a mean size that is less than one micrometer (step 200). The second layer may be formed on the first layer in similar manner by plasma spraying a powder of the second rare earth silicate having grains of a mean size that is greater than one micrometer (step 300). In a variant, the first and second layers may be formed by other thermal spray methods, such as plasma spraying a suspension or by deposition methods using a liquid technique, such as electrophoresis, dip coating, spray coating from a suspension of a powder having grains with a mean size that is less than or greater that one micrometer, depending on the layer being made.

Figure 4:
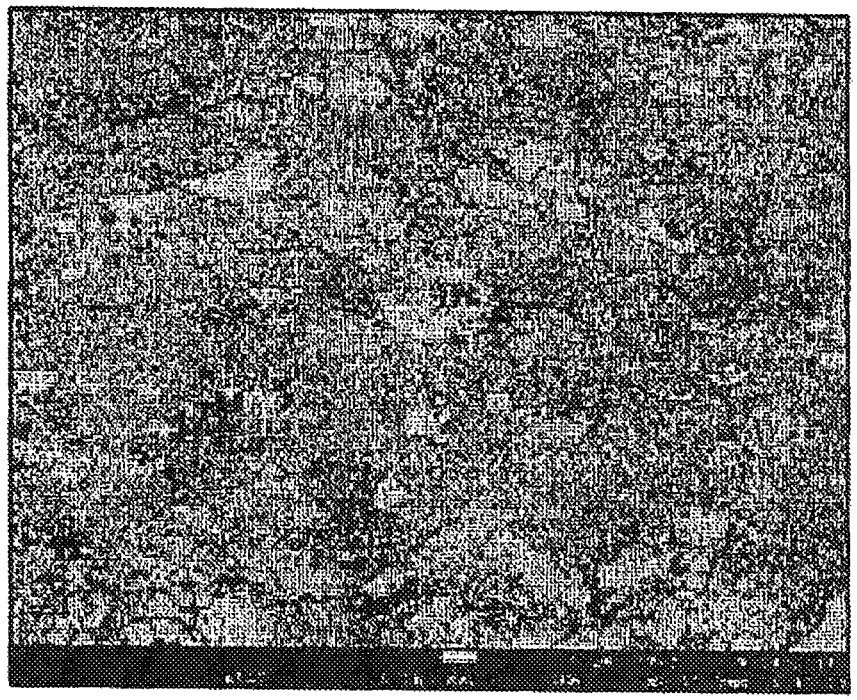
FIGS. 4 and 5 are photographs obtained by electron microscopy showing respectively first and second layers suitable for use in the context of the invention.
Figure 5:
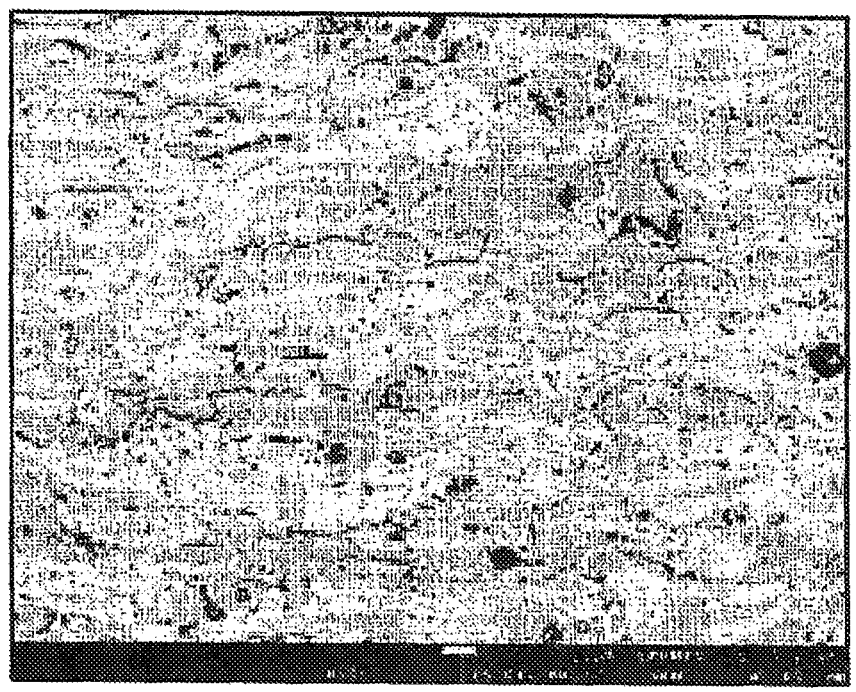

By way of illustration, FIG. 4 is a photograph of a first environmental barrier layer made of yttrium disilicate having grains with a mean size less than 1 µm, and FIG. 5 is a photograph of a second environmental barrier layer made of yttrium disilicate having grains with a mean size greater than 5 µm.

The top layer 14 of the thermal barrier may be formed, in conventional manner, by thermal spraying (optional step 400).

Once it has been made, the part can be used at a temperature that is higher than or equal to 800° C. in an atmosphere that is oxidizing and wet. In particular, it can be used at a temperature lying in the range 800° C. to 1500° C., or indeed in the range 800° C. to 1300° C. In particular, the part may be used in wet air.

The part made in this way may be a part for an aviation or aerospace application. The part may be a part for the hot portion of a gas turbine in an aeroengine or an aerospace engine or in an industrial turbine. The part may be a turbine engine part. The part may constitute at least a portion of a turbine nozzle, a portion of a propelling nozzle, or of a thermal protection coating, a wall of a combustion chamber, a turbine ring sector, or a turbine engine blade or vane.

EXAMPLES

Figure 6:
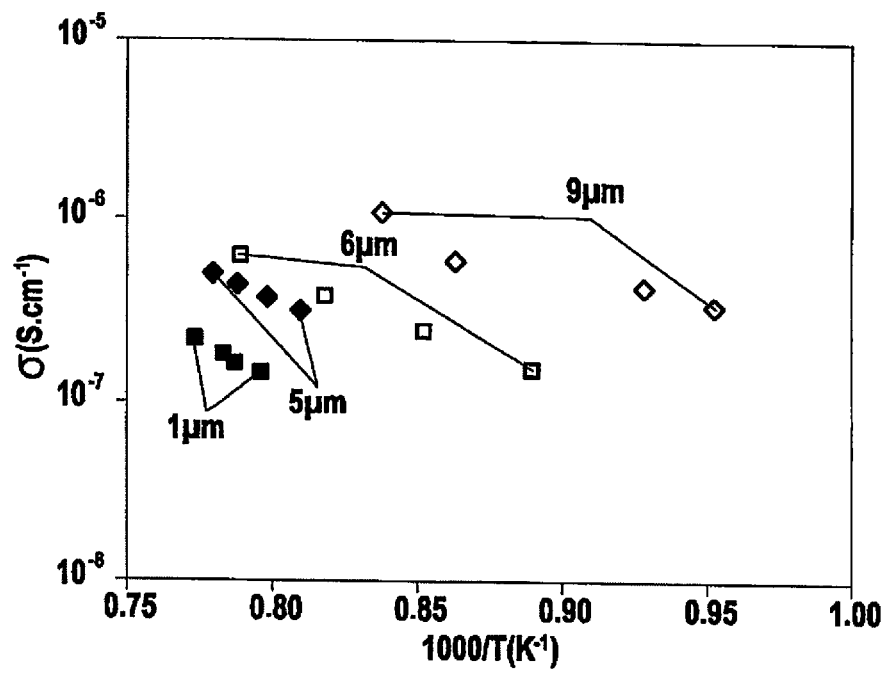
FIG. 6 shows a test result evaluating the influence of mean grain size on the barrier effect against the diffusion of oxidizing species as imparted by rare earth silicate layers.

Example 1: Evaluating the Barrier Effect Against Oxidizing Species as Conferred by an Example of a First Layer Suitable for Use in the Context of the Invention Four layers of yttrium disilicate having grains with respective mean sizes of 1 µm, 5 µm, 6 µm, and 9 µm were made. FIG. 6 shows the result of a test comparing the barrier effect against oxidizing species as conferred by those four layers. The test was performed at various temperatures in the range 750° C. to 1050° C. The figure shows the mean grain size value for each of the layers evaluated. FIG. 6 shows that the conductivity for oxidizing species decreases significantly with decreasing mean size for the grains in the layer. In particular, this test shows that the conductivity for oxidizing species in the layer having grains with a mean size of 1 µm is very significantly less than that presented by the other three layers. The conductivity measurements were performed by complex impedance spectroscopy in ambient air.

The layer of yttrium silicate having grains with a mean size of 1 µm may constitute the first layer in an example of a thermal barrier of the invention and it provides a good barrier effect against oxidizing species.

Figure 7:
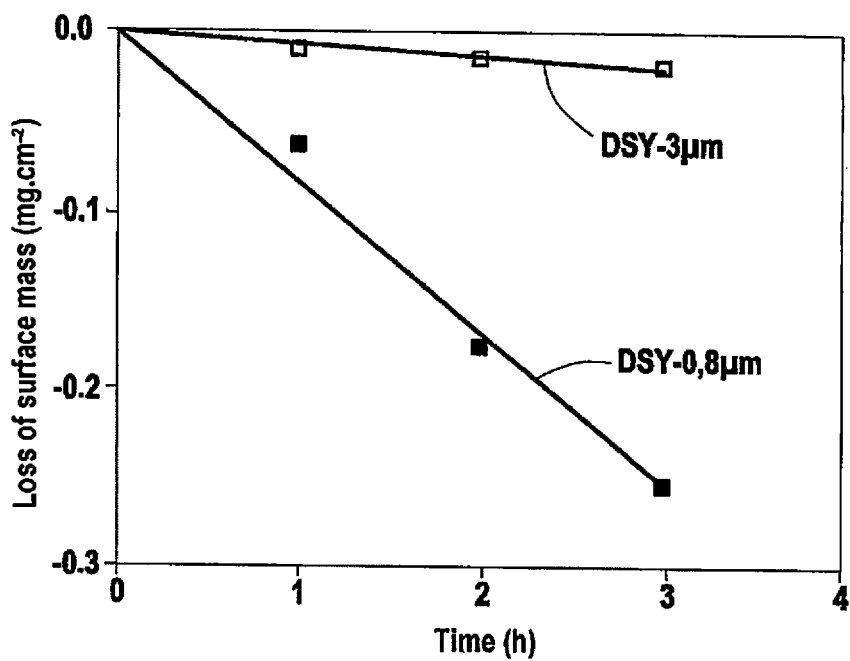
FIG. 7 shows a test result evaluating the influence of mean grain size on the resistance of the rare earth silicate layers to recession.

Example 2: Evaluating the Resistance to Recession Presented by an Example of a Second Layer Suitable for Use in the Context of the Invention Two layers of yttrium disilicate having grains with respective mean sizes of 0.8 µm and of 3 µm were made. FIG. 7 shows the results of a corrosion test comparing the resistance to the recession phenomenon as presented by those two layers. This figure shows the value of the mean grain size for each of the layers evaluated. FIG. 7 shows that the layer having a mean grain size of 3 µm presents resistance to recession that is significantly greater than that presented by the layer having a mean grain size of 0.8 µm. The recession measurements were determined using corrosion tests performed in a corrosion oven at 1400° C. at a pressure of 50 kilopascals (kPa) of $H_2O$ and 50 kPa of air with gas speeds of 5 centimeters per second (cm/s) in the cold zone of the oven.

The layer of yttrium disilicate having grains with a mean size of 3 µm is suitable for constituting the second layer in an example environmental barrier of the invention and it presents good resistance to recession.

The term "lying in the range . . . to . . ." should be understood as including the bounds.

The invention claimed is:

1. A part comprising a substrate having, adjacent to a surface of the substrate, at least a portion that is made of a material that contains silicon, and an environmental barrier formed on the surface of the substrate, the environmental barrier comprising:
 a first layer comprising at least one first rare earth silicate and presenting grains with a mean size less than or equal to 1 µm; and
 a second layer covering the first layer, the second layer comprising at least one second rare earth silicate and presenting grains with a mean size greater than 1 µm.

2. A part according to claim 1, wherein the second layer presents grains of a mean size greater than or equal to 3 µm.

3. A part according to claim 2, wherein the second layer presents grains of a mean size greater than or equal to 5 µm.

4. A part according to claim 3, wherein the second layer presents grains of mean size greater than or equal to 10 µm.

5. A part according to claim 1, wherein the environmental barrier further comprises an adhesion layer comprising silicon present between the first layer and the surface of the substrate.

6. A part according to claim 1, wherein the second layer is present in contact with the first layer.

7. A part according to claim 1, wherein the second rare earth silicate is a rare earth monosilicate.

8. A part according to claim 1, wherein the first rare earth silicate and the second rare earth silicate are selected, independently of each other, from: an ytterbium silicate and an yttrium silicate.

9. A part according to claim 8, wherein the first rare earth silicate is yttrium disilicate and the second rare earth silicate is ytterbium monosilicate.

10. A method of fabricating a part according to claim 1, the method comprising at least a first step of forming the first layer on the surface of the substrate, and a second step, performed after the first step, during which the second layer is formed on the first layer.

11. A method of using a part according to claim 1, the method comprising at least a step of using said part at a temperature higher than or equal to 800° C. in a medium that is oxidizing and wet.

* * * * *